(12) United States Patent
Park

(10) Patent No.: US 11,981,327 B2
(45) Date of Patent: May 14, 2024

(54) SAFE DRIVING CONTROL SYSTEM AND METHOD FOR VEHICLES

(71) Applicant: Hyundai Mobis Co., Ltd., Seoul (KR)

(72) Inventor: Ge O Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 141 days.

(21) Appl. No.: 17/335,435

(22) Filed: Jun. 1, 2021

(65) Prior Publication Data

US 2021/0380101 A1 Dec. 9, 2021

(30) Foreign Application Priority Data

Jun. 4, 2020 (KR) .......................... 10-2020-0067938

(51) Int. Cl.
*B60W 30/09* (2012.01)
*B60W 50/14* (2020.01)

(52) U.S. Cl.
CPC ............ *B60W 30/09* (2013.01); *B60W 50/14* (2013.01); *B60W 2554/4041* (2020.02); *B60W 2554/4042* (2020.02); *B60W 2554/4043* (2020.02); *B60W 2554/801* (2020.02); *B60W 2554/802* (2020.02); *B60W 2554/803* (2020.02); *B60W 2554/804* (2020.02)

(58) Field of Classification Search
CPC ................ B60W 30/09; B60W 50/14; B60W 2554/4041; B60W 2554/4042; B60W 2554/4043; B60W 2554/801; B60W 2554/802; B60W 2554/803; B60W 2554/804; B60W 2720/10; B60W 30/0953; B60W 30/08; B60W 40/10; B60W 30/16; B60R 21/013; B60Y 2300/08
See application file for complete search history.

(56) References Cited

U.S. PATENT DOCUMENTS

2013/0151058 A1\* 6/2013 Zagorski .............. G05D 1/0289
701/1
2013/0297196 A1\* 11/2013 Shida .................. B60W 30/143
701/119
(Continued)

FOREIGN PATENT DOCUMENTS

CN 103158705 A 6/2013
CN 104943689 A 9/2015
(Continued)

OTHER PUBLICATIONS

Chinese Office Action issued on Jun. 22, 2023, in counterpart Chinese Patent Application No. 202110621418.4 (11 pages in English, 9 pages in Chinese).

*Primary Examiner* — Peter D Nolan
*Assistant Examiner* — Ashley L Redhead, Jr.
(74) *Attorney, Agent, or Firm* — NSIP Law

(57) ABSTRACT

A safe driving control system for vehicles includes one or more processors configured to: recognize a nearby vehicle approaching a host vehicle, and collect information about the nearby vehicle; receive distance information of the nearby vehicle, and determine an extent of collision danger between the host vehicle and the nearby vehicle based on a distance between the host vehicle and the nearby vehicle; and move the host vehicle in a direction in which there are no vehicles therearound based on the extent of collision danger.

14 Claims, 7 Drawing Sheets

(56) References Cited

U.S. PATENT DOCUMENTS

| | | | |
|---|---|---|---|
| 2014/0309884 A1* | 10/2014 | Wolf | B62D 15/0265 |
| | | | 701/41 |
| 2017/0088136 A1 | 3/2017 | Seo et al. | |
| 2018/0043888 A1 | 2/2018 | Wolf | |
| 2018/0281763 A1* | 10/2018 | Ohmori | B60W 30/18109 |
| 2018/0370527 A1* | 12/2018 | Rachor | B60W 30/18163 |
| 2019/0276013 A1 | 9/2019 | Kim | |
| 2020/0172011 A1* | 6/2020 | Acervo | B60Q 9/008 |
| 2020/0262424 A1* | 8/2020 | Kong | G01C 21/20 |
| 2021/0221379 A1* | 7/2021 | Sato | F16H 61/0213 |
| 2023/0031030 A1* | 2/2023 | Park | B60W 30/16 |

FOREIGN PATENT DOCUMENTS

| | | |
|---|---|---|
| CN | 110239531 A | 9/2019 |
| KR | 10-2014-0080181 A | 6/2014 |
| KR | 10-1533884 B1 | 7/2015 |
| KR | 10-2018-0008223 A | 1/2018 |

* cited by examiner

SAFE DRIVING CONTROL SYSTEM AND METHOD FOR VEHICLES

CROSS-REFERENCE TO RELATED APPLICATION

This application claims the benefit of Korean Patent Application No. 10-2020-0067938, filed on Jun. 4, 2020 with the Korean Intellectual Property Office, the disclosure of which is herein incorporated by reference in its entirety.

BACKGROUND OF THE INVENTION

1. Field of the Invention

The present invention relates to a safe driving control system and method for vehicles capable of avoiding a nearby vehicle approaching a host vehicle during driving, thereby preventing a traffic collision.

2. Description of the Related Art

In general, cruise control of a vehicle is configured such that the vehicle is automatically driven at a speed set by a driver without acceleration and deceleration, thereby improving driver convenience. With gradual development thereof, cruise control has been implemented as various systems capable of considering driver convenience, stability, and fuel efficiency.

In conventional adaptive cruise control, a host vehicle is automatically driven, and control is performed such that the distance between the host vehicle and a preceding vehicle is maintained in order to avoid collision with the preceding vehicle when the preceding vehicle is sensed in front of the vehicle. That is, the distance between the host vehicle and the preceding vehicle is maintained in order to prevent collision with the preceding vehicle.

Even though the distance between the host vehicle and the preceding vehicle is maintained during driving, however, it is not possible to secure driving stability. That is, a nearby vehicle may excessively approach the host vehicle from behind the host vehicle, whereby collision between the host vehicle and the nearby vehicle may occur. In the case in which the nearby vehicle is simply avoided, the host vehicle may cross a center line and may collide with a vehicle coming from the opposite direction or may deviate from a load and may collide with a guardrail.

The matters disclosed in this section are merely for enhancement of understanding of the general background of the invention and should not be taken as an acknowledgment or any form of suggestion that the matters form the related art already known to a person skilled in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a safe driving control system for vehicles includes one or more processors configured to: recognize a nearby vehicle approaching a host vehicle, and collect information about the nearby vehicle; receive distance information of the nearby vehicle, and determine an extent of collision danger between the host vehicle and the nearby vehicle based on a distance between the host vehicle and the nearby vehicle; and move the host vehicle in a direction in which there are no vehicles therearound based on the extent of collision danger.

The system may further include a memory configured to store instructions. The one or more processors may be further configured to execute the instructions to configure the one or more processors to: recognize the nearby vehicle approaching the host vehicle, and collect the information about the nearby vehicle; receive the distance information of the nearby vehicle, and determine the extent of collision danger between the host vehicle and the nearby vehicle based on the distance between the host vehicle and the nearby vehicle; and move the host vehicle in the direction in which there are no vehicles therearound based on the extent of collision danger.

The one or more processors may include an information collection unit configured to recognize the nearby vehicle approaching the host vehicle, and collect the information about the nearby vehicle; a collision determination unit configured to receive the distance information of the nearby vehicle through the information collection unit, and determine the extent of collision danger between the host vehicle and the nearby vehicle based on the distance between the host vehicle and the nearby vehicle; and a driving controller configured to move the host vehicle in the direction in which there are no vehicles therearound based on the extent of collision danger through the collision determination unit.

The collision determination unit may be further configured to divide the extent of collision danger into a warning part and a danger part. The distance between the host vehicle and the nearby vehicle may be set to be less than a pre-stored set distance for the warning part. The distance between the host vehicle and the nearby vehicle may be set to a danger distance shorter than the set distance for the danger part.

The safe driving control system may further include a warning signaling unit configured to transmit a warning signal to the host vehicle. Upon determining that the extent of collision danger is the warning part, through the collision determination unit, the warning signaling unit may be further configured to transmit the warning signal to the host vehicle.

Upon determining that the extent of collision danger is the danger part, through the collision determination unit, the driving controller may be further configured to move the host vehicle in a direction in which there are no vehicles therearound.

The collision determination unit may be further configured to receive speed information of the nearby vehicle. In a case in which a speed of the nearby vehicle is higher than a speed of the host vehicle, the collision determination unit may be further configured to determine the extent of collision danger between the host vehicle and the nearby vehicle based on a difference in speed between the host vehicle and the nearby vehicle.

In a case in which the difference in the speed between the host vehicle and the nearby vehicle is equal to or greater than a set speed, the collision determination unit may be further configured to determine that collision danger will occur.

Upon determining that the speed of the nearby vehicle is higher, by the set speed or more, than the speed of the host vehicle through the collision determination unit, the driving controller may be further configured to accelerate the host vehicle such that the difference in speed between the host vehicle and the nearby vehicle is equal to or greater than a predetermined safe speed.

The information collection unit may be further configured to recognize an obstacle around the host vehicle. When the host vehicle moves toward the obstacle upon moving in a direction in which there are no vehicles therearound as a result of determination that the distance between the host vehicle and the nearby vehicle will cause collision danger, the driving controller may be further configured to perform control such that the distance between the host vehicle and the obstacle is equal to or greater than a predetermined safe distance.

The information collection unit may be further configured to recognize vehicle lines around the host vehicle. When the host vehicle moves in a direction in which there are no vehicles as a result of determination that the distance between the host vehicle and the nearby vehicle will cause collision danger, the driving controller may be further configured to perform control such that the host vehicle does not cross a center line.

The one or more processors may be engine control units (ECUs).

In another general aspect, a safe driving control method for vehicles includes a sensing operation of recognizing a nearby vehicle approaching a host vehicle, an information collection operation of collecting information about the nearby vehicle recognized through the sensing step, a collision determination operation of receiving distance information of the nearby vehicle collected in the information collection operation, and determining an extent of collision danger between the host vehicle and the nearby vehicle based on a distance between the host vehicle and the nearby vehicle, and a driving control operation of moving the host vehicle in a direction in which there are no vehicles therearound upon determining that the distance between the host vehicle and the nearby vehicle will cause collision danger through the collision determination operation.

In the collision determination operation, the extent of collision danger may be divided into a warning operation and a danger operation. In the warning operation, the distance between the host vehicle and the nearby vehicle may be set to less than a pre-stored set distance. In the danger operation, the distance between the host vehicle and the nearby vehicle may be set to a danger distance shorter than the set distance.

When the extent of collision danger is the warning operation in the collision determination operation, the method may further include a warning generation operation of transmitting a warning signal to the host vehicle.

Upon determining that the extent of collision danger is the danger operation in the collision determination operation, the driving control operation may be performed to move the host vehicle in a direction in which there are no vehicles around the host vehicle.

In the collision determination operation, speed information of the nearby vehicle may be further received and the extent of collision danger may be determined based on a difference in speed between the host vehicle and the nearby vehicle.

In a case in which the difference in speed between the host vehicle and the nearby vehicle is equal to or greater than a set speed, collision danger may be determined to occur in the collision determination operation.

Upon determining that the speed of the nearby vehicle is higher, by the set speed or more, than the speed of the host vehicle through the collision determination unit, the host vehicle may be accelerated such that the difference in speed between the host vehicle and the nearby vehicle is equal to or greater than a predetermined safe speed in the driving control operation.

An obstacle around the host vehicle may be further recognized in the information collection operation. When the host vehicle moves toward the obstacle when the host vehicle moves in a direction in which there are no vehicles therearound, as a result of determination that the distance between the host vehicle and the nearby vehicle will cause collision danger, control may be performed such that the distance between the host vehicle and the obstacle is equal to or greater than a predetermined safe distance in the driving control operation.

Vehicle lines around the host vehicle may be further recognized in the information collection operation. When the host vehicle moves in a direction in which there are no vehicles as a result of determination that the distance between the host vehicle and the nearby vehicle will cause collision danger, control may be performed such that the host vehicle does not cross a center line in the driving control operation.

A non-transitory computer-readable storage medium may store instructions that, when executed by one or more processors, cause the one or more processors to perform the method above.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, a safe driving control system and method for vehicles according to preferred embodiments of the present invention will be described with reference to the accompanying drawings.

The present invention has been made in view of the above problems, and it is an object of the present invention to provide a safe driving control system and method for vehicles capable of avoiding a nearby vehicle approaching a host vehicle during driving, thereby preventing a traffic collision, and performing control such that collision with an obstacle is prevented or the host vehicle does not cross a center line when avoiding the nearby vehicle, thereby securing driving stability.

Figure 1:
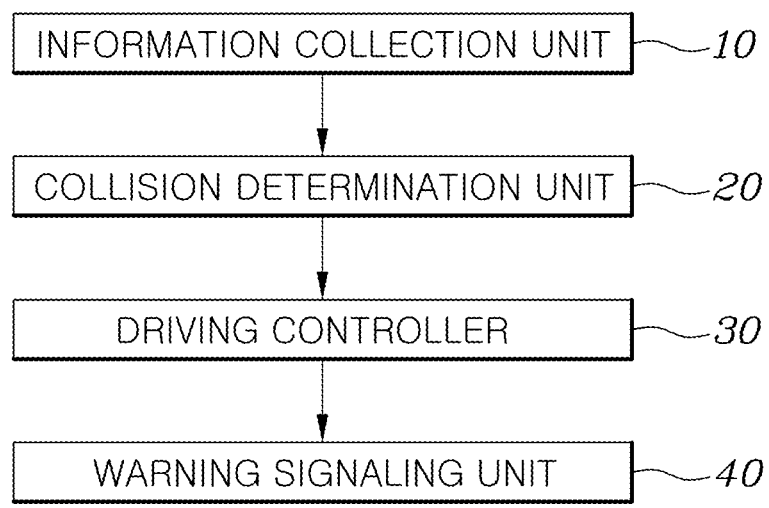
FIG. 1 is a view showing the construction of a safe driving control system for vehicles according to the present invention.
Figure 5:
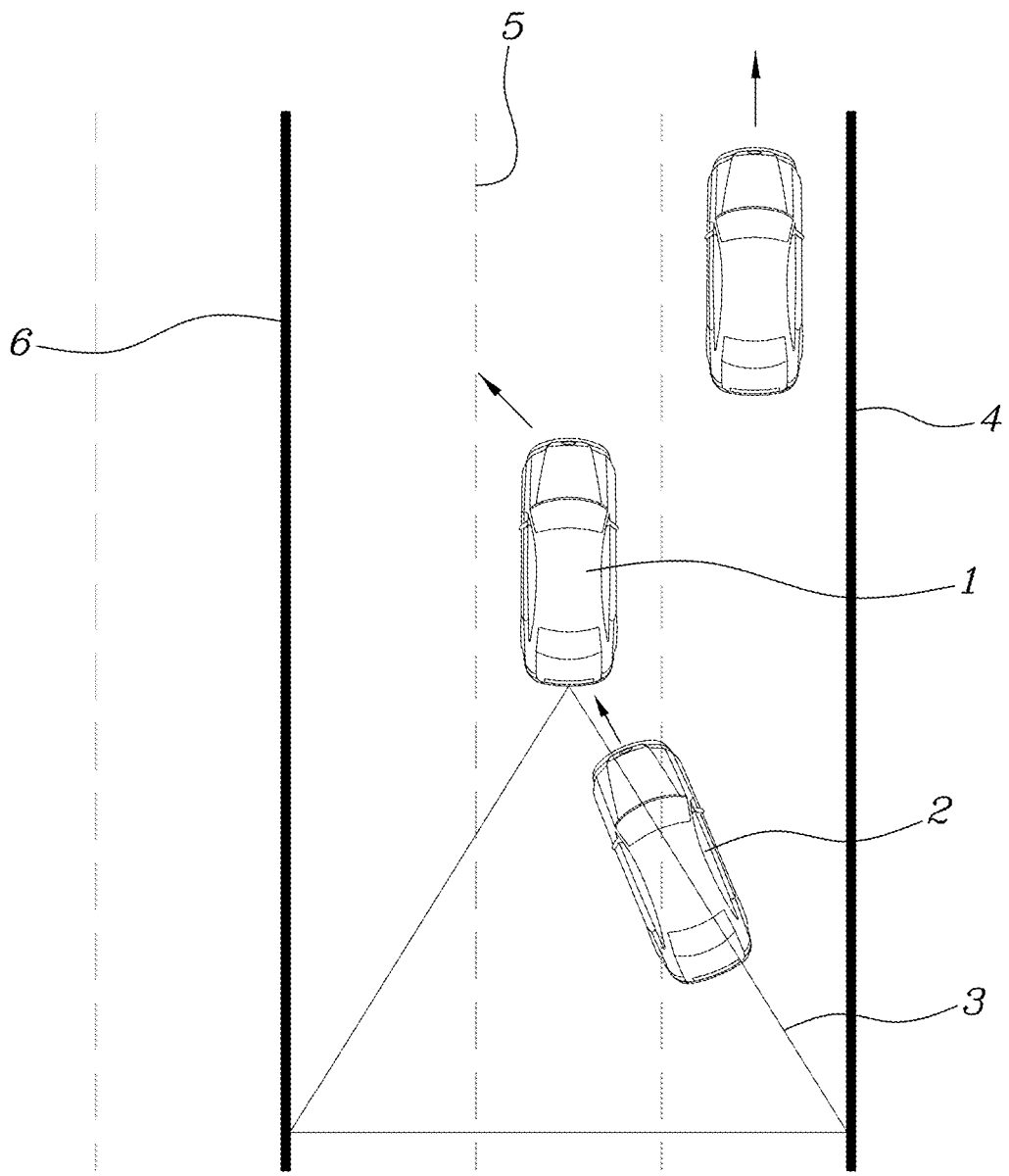
Figure 6:
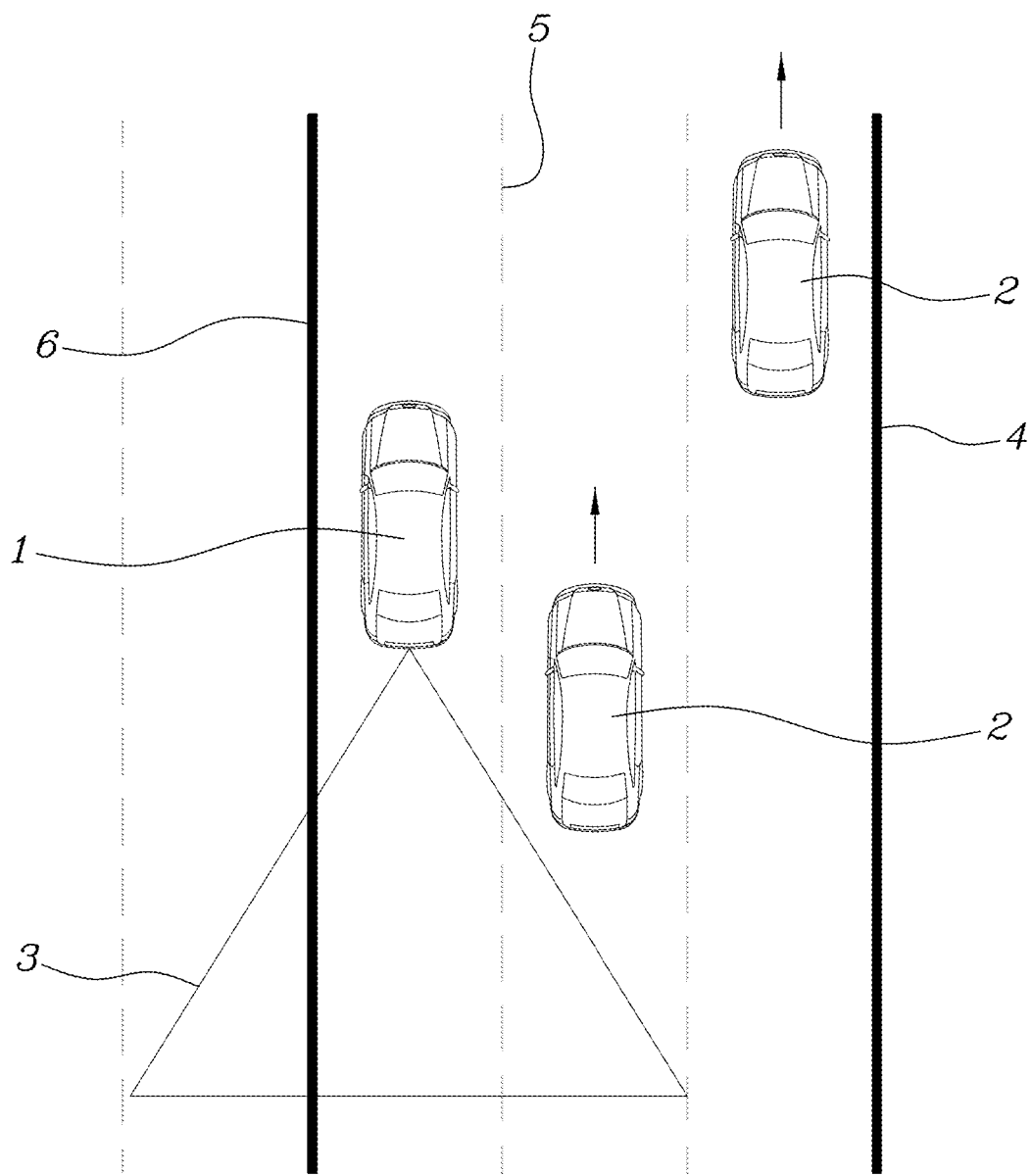
Figure 7:
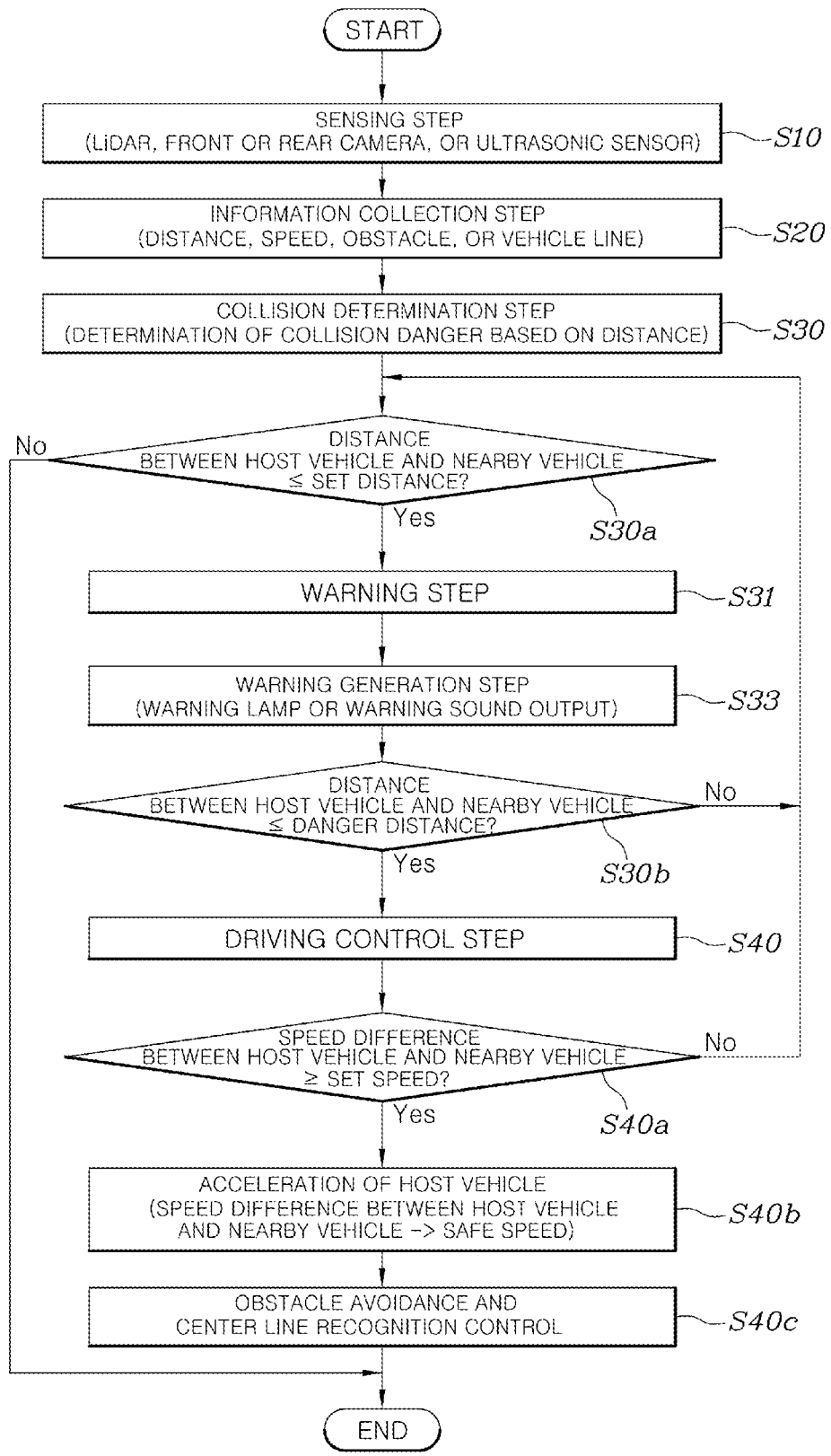
FIG. 7 is a flowchart of a safe driving control method for vehicles according to the present invention.

FIG. 1 is a view showing the construction of a safe driving control system for vehicles according to the present invention, FIGS. 2 to 6 are views illustrating the safe driving control system for vehicles shown in FIG. 1, and FIG. 7 is a flowchart of a safe driving control method for vehicles according to the present invention.

The present invention may be applied to a vehicle that is directly driven by a driver or to an autonomous vehicle, which is a self-driving vehicle. That is, the present invention is configured to escape a collision danger situation that is not recognized by the driver, and the vehicle may be driven under control of an ECU as well as by the driver.

As shown in FIG. 1, the safe driving control system for vehicles according to the present invention includes an information collection unit 10 configured to recognize a nearby vehicle approaching a host vehicle and to collect information about the nearby vehicle, a collision determination unit 20 configured to receive distance information of the nearby vehicle through the information collection unit 10 and to determine the extent of collision danger between the host vehicle and the nearby vehicle based on the distance between the host vehicle and the nearby vehicle, and a driving controller 30 configured to move the host vehicle in a direction in which there are no vehicles therearound upon determining that the distance between the host vehicle and the nearby vehicle will cause collision danger through the collision determination unit 20.

The information collection unit 10 may collect information about the nearby vehicle through any of various sensors. Here, the sensors may include LiDAR, a front camera, front radar, an ultrasonic sensor, and a rear camera, and may acquire information about the shape, size, speed, and distance of the nearby vehicle.

The information about the nearby vehicle collected by the information collection unit 10 is provided to the collision determination unit 20, and the collision determination unit 20 determines the extent of collision danger based on the input information. Here, the collision determination unit 20 may determine the extent of collision danger based on the distance between the host vehicle and the nearby vehicle before everything else. The extent of collision danger based on the distance between the host vehicle and the nearby vehicle during driving may be stored as data in advance in consideration of the shape, size, speed, and distance of the nearby vehicle.

Upon determining whether there is collision danger between the host vehicle and the nearby vehicle and that collision danger will occur through the collision determination unit 20, the driving controller 30 moves the host vehicle in a direction in which there are no vehicles therearound. That is, the driving controller 30 controls driving of the host vehicle and controls the nearby vehicle in order to avoid collision with the nearby vehicle when the nearby vehicle approaches the host vehicle. At this time, the driving controller 30 moves the host vehicle in a direction in which there are no vehicles therearound based on information about whether there are vehicles therearound acquired through the information collection unit 10, it is possible to prevent collision with other vehicles when avoiding the nearby vehicle.

As a result, safety of the vehicle during driving is improved, whereby passenger's driving reliability is secured.

The present invention will be described in detail. The collision determination unit 20 divides the extent of collision danger based on the distance between the host vehicle and the nearby vehicle into a warning part and a danger part. For the warning part, the distance between the host vehicle and the nearby vehicle may be set to less than a pre-stored set distance. For the danger part, the distance between the host vehicle and the nearby vehicle may be set to a danger distance shorter than the set distance.

Since the extent of collision danger is divided into the warning part and the danger part, it is possible to remove a sense of difference caused as the result of the host vehicle avoiding the nearby vehicle approaching the host vehicle in an unnecessary situation and to positively avoid the nearby vehicle in a high collision danger situation.

Specifically, for the warning part, the distance between the host vehicle and the nearby vehicle may be set to less than a pre-stored set distance. Here, the set distance is a pre-stored value, which may be differently set depending on the shape and size of the vehicle.

For the danger part, the distance between the host vehicle and the nearby vehicle may be set to a danger distance shorter than the set distance. That is, the distance that determines the danger part is set to be shorter than the set distance. Consequently, the nearby vehicle is sensed first in the warning part, and then the nearby vehicle is coped with in the danger part.

Figure 2:
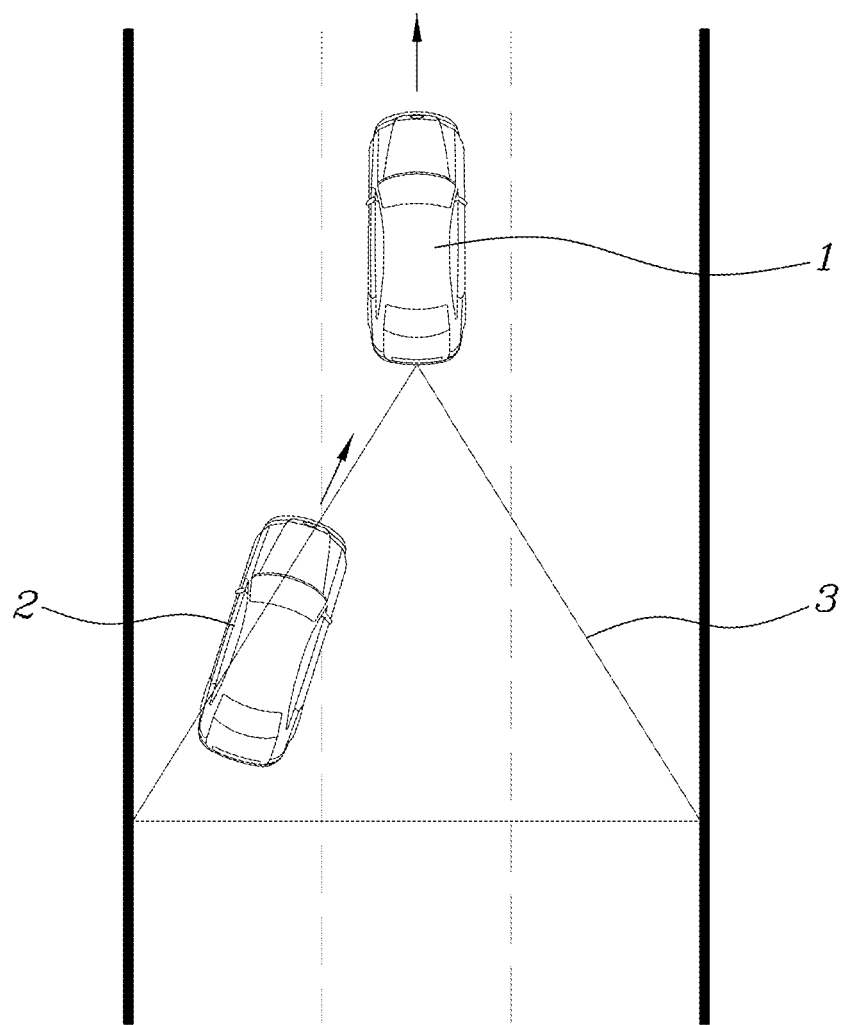
FIGS. 2 to 6 are views illustrating the safe driving control system for vehicles shown in FIG. 1.

In an embodiment, on the assumption that the sensor provides information about the nearby vehicle to the information collection unit 10 is a rear camera, it is determined whether the nearby vehicle enters a sensing area 3 of the rear camera. Here, in the case in which the nearby vehicle enters the set distance in the sensing area 3 of the rear camera, as shown in FIG. 2, the collision determination unit 20 determines that the extent of collision danger is the warning part.

Particularly, in the present invention, a warning signaling unit 40 configured to transmit a warning signal to the host vehicle may be included. Upon determining that the extent of collision danger is the warning part through the collision determination unit 20, the warning signaling unit 40 transmits a warning signal to the host vehicle. Here, the warning signaling unit 40 may inform a passenger of the current situation through a warning lamp or a warning sound, and the passenger may recognize the current situation and cope with a safety-related accident.

Figure 3:
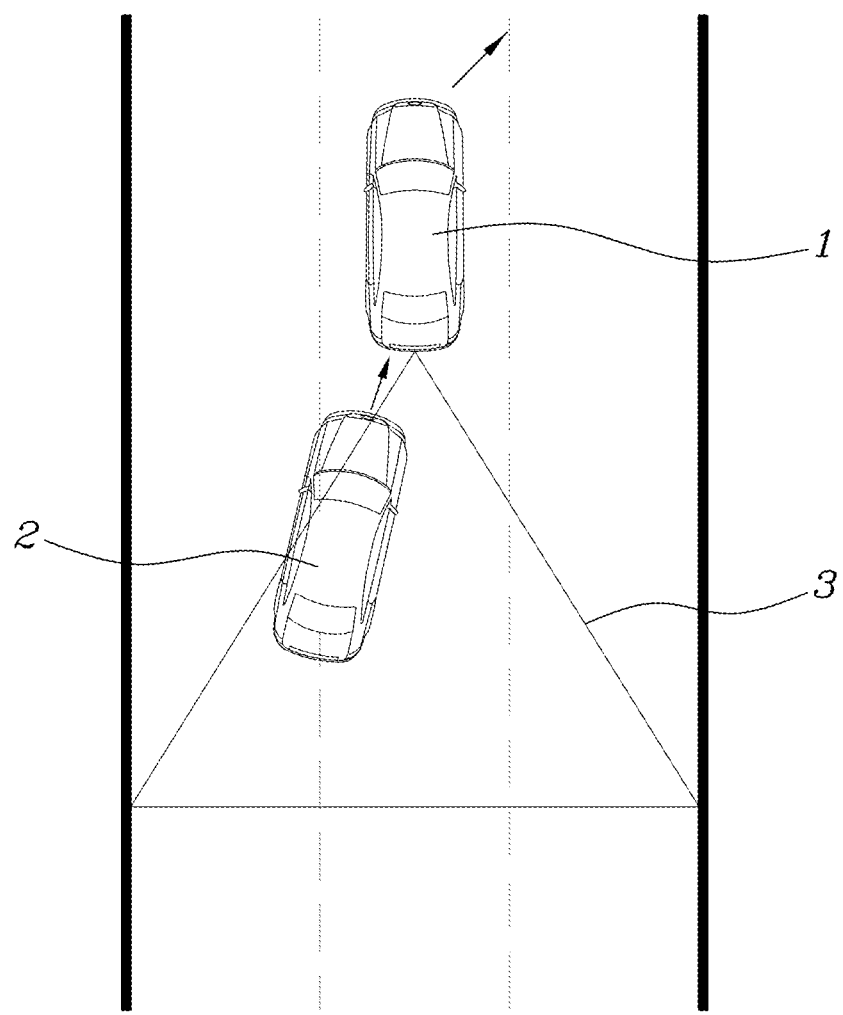
Figure 4:
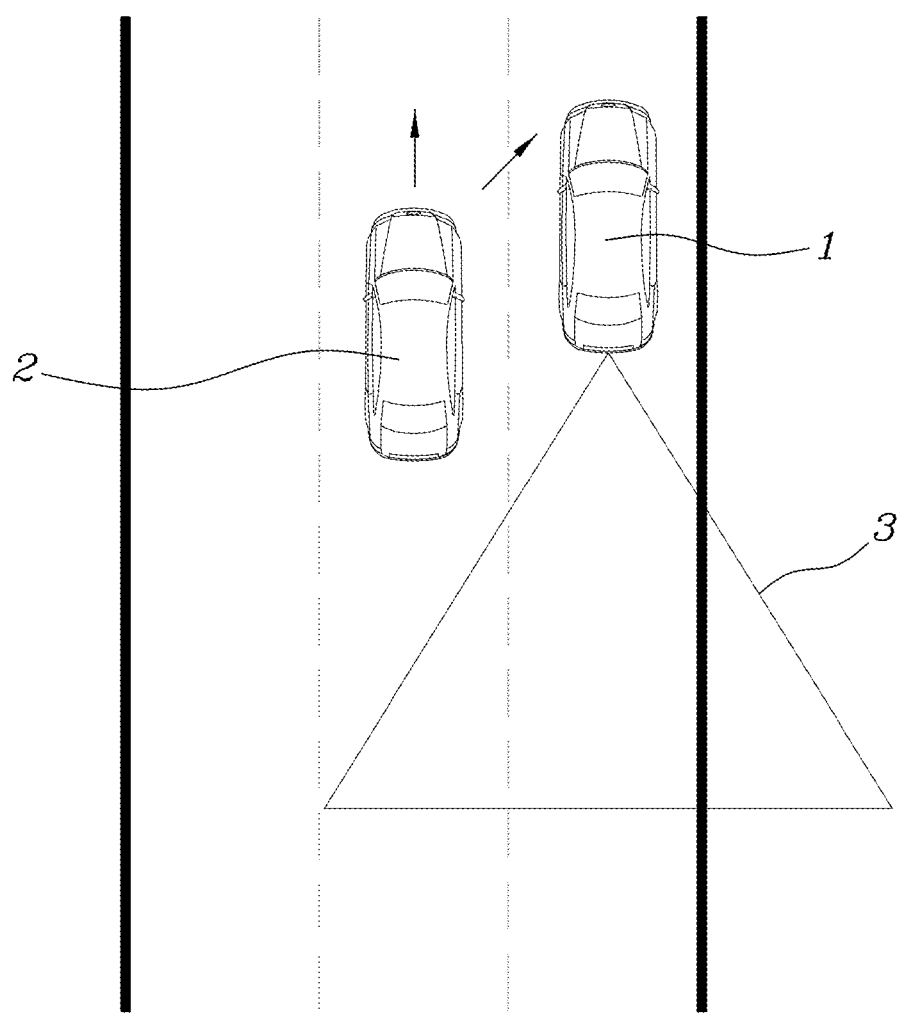

Subsequently, when the nearby vehicle enters the danger distance in the sensing area 3 of the rear camera, as shown in FIG. 3, the collision determination unit 20 determines that the extent of collision danger is the danger part. As a result, as shown in FIG. 4, upon determining that the extent of collision danger is the danger part through the collision determination unit 20, In the present invention, as described above, a warning message is transmitted and vehicle control is performed according to the extent of collision danger based on the distance between the host vehicle and the nearby vehicle, whereby the passenger recognizes the current situation, and therefore safety is secured. In addition, unnecessary driving control of the host vehicle is not performed, whereby no sense of difference occurs.

Meanwhile, the collision determination unit 20 may further receive speed information of the nearby vehicle. In the case in which the speed of the nearby vehicle is higher than the speed of the host vehicle, the collision determination unit 20 may determine the extent of collision danger between the host vehicle and the nearby vehicle based on the difference in speed between the host vehicle and the nearby vehicle.

The information collection unit 10 may collect speed information of the nearby vehicle, and the collision determination unit 20 may determine the extent of collision danger based on the speed information of the nearby vehicle received from the information collection unit 10. That is, in the case in which the speed of the nearby vehicle approaching the host vehicle is higher, response of the host vehicle to the nearby vehicle may be slow, whereby there is collision danger.

Consequently, the collision determination unit 20 may further receive speed information of the nearby vehicle such that vehicle control is performed based thereon.

Specifically, in the case in which the difference in speed between the host vehicle and the nearby vehicle is equal to or greater than a set speed, the collision determination unit 20 may determine that collision danger will occur. Here, the set speed, which is a speed at which the host vehicle is capable of avoiding the nearby vehicle approaching the host vehicle in response thereto, is derived in advance and stored. That is, in the case in which the difference in speed between the host vehicle and the nearby vehicle is equal to or greater than the set speed, the collision determination unit may determine that collision danger is high when the host vehicle avoids the nearby vehicle, and vehicle control is performed.

At this time, upon determining that the speed of the nearby vehicle is higher, by the set speed or more, than the speed of the host vehicle through the collision determination unit 20, the driving controller 30 accelerates the host vehicle such that the difference in speed between the host vehicle and the nearby vehicle is equal to or greater than a predetermined safe speed. Here, the safe speed, which is a speed at which the host vehicle is capable of safely avoiding the nearby vehicle approaching the host vehicle in response thereto, may be set in advance in the driving controller 30.

That is, in the case in which the difference in speed between the host vehicle and the nearby vehicle is equal to or greater than the set speed, the host vehicle is accelerated so as to avoid collision with the nearby vehicle. At this time, the driving controller 30 accelerates the host vehicle until the difference in speed between the host vehicle and the nearby vehicle is equal to or greater than the safe speed, whereby the host vehicle more safely avoids the nearby vehicle. In the case in which the difference in speed between the host vehicle and the nearby vehicle is equal to or greater than the safe speed, as described above, the distance between the host vehicle and the nearby vehicle is slowly decreased, whereby it is possible to easily escape a collision danger situation.

Meanwhile, the information collection unit 10 may further recognize an obstacle B around the host vehicle. Consequently, in the case which the host vehicle moves toward the obstacle B when the host vehicle moves in a direction in which there are no vehicles therearound as the result of determination that the distance between the host vehicle and the nearby vehicle will cause collision danger, the driving controller 30 may perform control such that the distance between the host vehicle and the obstacle B is equal to or greater than a predetermined safe distance.

As shown in FIGS. 5 and 6, various obstacles B, such as a guardrail, may be located on a road, in addition to vehicles. Consequently, the driving controller 30 may receive information about each obstacle B from the information collection unit 10, and may control movement of the host vehicle such that there is no obstacle B around the host vehicle or such that the distance between the obstacle B and the host vehicle is equal to or greater than the safe distance. Here, the safe distance may be set based on the shape and size of the vehicle and may be set such that the vehicle is sufficiently spaced apart from the obstacle B so as to avoid collision therewith.

As described, the obstacles B around the host vehicle are recognized, and collision between the host vehicle and the nearby vehicle is avoided in consideration of the obstacles B, whereby driving stability is further secured.

Meanwhile, the information collection unit 10 may further recognize vehicle lines around the host vehicle. When the host vehicle moves in a direction in which there are no vehicles as the result of determination that the distance between the host vehicle and the nearby vehicle will cause collision danger, therefore, the driving controller 30 may perform control such that the host vehicle does not cross the center line.

That is, as shown in FIGS. 5 and 6, the vehicles lines on the road are divided into a vehicle line 5 configured to partition the same driving direction and a vehicle line 6 configured to partition the opposite driving direction. In particular, the vehicle line 6 configured to partition the opposite driving direction is the center line. In the case in which the vehicle crosses the center line, accident danger is very high.

When the host vehicle moves as the result of determination that the distance between the host vehicle and the nearby vehicle will cause collision danger, therefore, the driving controller 30 performs control such that the host vehicle moves in a direction in which there are no vehicles and such that the host vehicle does not cross the center line, whereby collision with a vehicle coming from the opposite direction is avoided.

Meanwhile, as shown in FIG. 7, a safe driving control method according to the present invention includes a sensing step (S10) of recognizing a nearby vehicle approaching a host vehicle, an information collection step (S20) of collecting information about the nearby vehicle recognized through the sensing step (S10), a collision determination step (S30) of receiving distance information of the nearby vehicle collected in the information collection step (S20) and determining the extent of collision danger between the host vehicle and the nearby vehicle based on the distance between the host vehicle and the nearby vehicle, and a driving control step (S40) of moving the host vehicle in a direction in which there are no vehicles therearound upon determining that the distance between the host vehicle and the nearby vehicle will cause collision danger through the collision determination step (S30).

In the sensing step (S10), the information about the nearby vehicle is acquired through LiDAR, a front camera, front radar, an ultrasonic sensor, or a rear camera. In the information collection step (S20), information about the shape, size, speed, and distance of the nearby vehicle is collected.

In the collision determination step (S30), the extent of collision danger may be determined based on the distance between the host vehicle and the nearby vehicle before everything else. The extent of collision danger based on the distance between the host vehicle and the nearby vehicle during driving may be stored as data in advance in consideration of the shape, size, speed, and distance of the nearby vehicle.

In the collision determination step (S30), the extent of collision danger based on the distance between the host vehicle and the nearby vehicle may be divided into a warning step (S31) and a danger step (S32). In the warning step (S31), the distance between the host vehicle and the nearby vehicle may be set to less than a pre-stored set distance. In the danger step (S32), the distance between the host vehicle and the nearby vehicle may be set to a danger distance shorter than the set distance.

That is, it is determined whether the distance between the host vehicle and the nearby vehicle is less than the pre-stored set distance (S30a). When the distance between the host vehicle and the nearby vehicle is less than the set distance, it is determined that the extent of collision danger is the warning step (S31). When the extent of collision danger is the warning step (S31), a warning generation step (S33) of transmitting a warning signal to the host vehicle is performed such that a passenger recognizes the current situation.

Subsequently, whether the nearby vehicle further moves toward the host vehicle and enters the danger distance is determined (S30b). In the case in which the nearby vehicle enters the danger distance, it is determined that the extent of collision danger is the danger step (S32).

In the case in which the extent of collision danger is the danger step (S32), the driving control step (S40) is performed to move the host vehicle in a direction in which there are no vehicles around the host vehicle, whereby collision between the host vehicle and the nearby vehicle is avoided.

Meanwhile, in the collision determination step (S30), speed information of the nearby vehicle is further received. In the case in which the speed of the nearby vehicle is higher than the speed of the host vehicle, the extent of collision danger between the host vehicle and the nearby vehicle is determined based on the difference in speed between the host vehicle and the nearby vehicle.

That is, in the collision determination step (S30), whether the difference in speed between the host vehicle and the nearby vehicle is equal to or greater than a set speed is determined (S40a). In the case in which the difference in speed between the host vehicle and the nearby vehicle is equal to or greater than the set speed, it is determined that collision danger will occur. Upon determining that the speed of the nearby vehicle is higher, by the set speed or more, than the speed of the host vehicle in the driving control step (S40), the host vehicle is accelerated such that the difference in speed between the host vehicle and the nearby vehicle is equal to or greater than a predetermined safe speed (S40b).

Meanwhile, an obstacle B around the host vehicle is further recognized in the information collection step (S20). In the case which the host vehicle moves toward the obstacle B when the host vehicle moves in a direction in which there are no vehicles therearound as the result of determination that the distance between the host vehicle and the nearby vehicle will cause collision danger, control may be performed such that the distance between the host vehicle and the obstacle B is equal to or greater than a predetermined safe distance in the driving control step (S40).

Also, in the information collection step (S20), vehicle lines around the host vehicle are further recognized. When the host vehicle moves in a direction in which there are no vehicles as the result of determination that the distance between the host vehicle and the nearby vehicle will cause collision danger, control may be performed such that the host vehicle does not cross a center line in the driving control step (S40).

When collision between the host vehicle and the nearby vehicle is avoided, control may be performed such that collision with the obstacle B is avoided or the host vehicle does not cross the center line (S40c), whereby driving stability is further secured.

In the safe driving control system and method for vehicles described above, it is possible to avoid the nearby vehicle approaching the host vehicle during driving, whereby it is possible to prevent collision therebetween, and it is possible to perform control such that collision with the obstacle B is prevented or the host vehicle does not cross the center line when avoiding the nearby vehicle, whereby it is possible to secure driving stability.

As is apparent from the above description, the safe driving control system and method for vehicles have effects in that it is possible to avoid the nearby vehicle approaching the host vehicle during driving, whereby it is possible to prevent collision therebetween, and it is possible to perform control such that collision with the obstacle B is prevented or the host vehicle does not cross the center line when avoiding the nearby vehicle, whereby it is possible to secure driving stability.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A safe driving control system for vehicles comprising:
one or more processors configured to:
recognize a nearby vehicle approaching a host vehicle, vehicle lines and an obstacle around the host vehicle, and collect information about the nearby vehicle;
receive distance information of the nearby vehicle, and determine an extent of collision danger between the host vehicle and the nearby vehicle based on a distance between the host vehicle and the nearby vehicle;
receive speed information of the nearby vehicle, and accelerate the host vehicle upon determining that a speed of the nearby vehicle is higher than a speed of the host vehicle and a speed difference between the host and nearby vehicles is equal to or greater than a preset safe speed;
control the host vehicle such that a distance between the host vehicle and the obstacle around the host vehicle is equal to or greater than a preset safe distance when the distance between the host vehicle and the nearby vehicle is less than a preset danger distance and the host vehicle moves toward the obstacle upon moving in a direction where there are no vehicles around the host vehicle; and
control the host vehicle to not cross a center line when the distance between the host vehicle and the nearby vehicle is less than the preset danger distance and the host vehicle moves in the direction where there are no vehicles around the host vehicle.

2. The system of claim 1, further comprising a memory configured to store instructions,
wherein the one or more processors are further configured to execute the instructions, thereby configuring the one or more processors to:
recognize the nearby vehicle approaching the host vehicle, and collect the information about the nearby vehicle;
receive the distance information of the nearby vehicle, and determine the extent of collision danger between the host vehicle and the nearby vehicle based on the distance between the host vehicle and the nearby vehicle;
receive the speed information of the nearby vehicle, and determine that the collision danger will occur in response to the speed of the nearby vehicle being higher than that of the host vehicle and the speed difference between the host and nearby vehicles being equal to or greater than the set speed; and
move the host vehicle in a direction in which there are no vehicles therearound based on the extent of collision danger.

3. The system of claim 1, wherein the one or more processors comprise:
an information collection unit configured to recognize the nearby vehicle approaching the host vehicle, and collect the information about the nearby vehicle;

a collision determination unit configured to receive the distance information of the nearby vehicle through the information collection unit, and determine the extent of collision danger between the host vehicle and the nearby vehicle based on the distance between the host vehicle and the nearby vehicle; and a driving controller configured to move the host vehicle in a direction in which there are no vehicles therearound based on the extent of collision danger through the collision determination unit.

4. The safe driving control system of claim 3, wherein:
the collision determination unit is further configured to divide the extent of collision danger into a warning part and a danger part,
the distance between the host vehicle and the nearby vehicle is set to be less than a pre-stored set distance for the warning part, and
the distance between the host vehicle and the nearby vehicle is set to a danger distance shorter than the set distance for the warning part.

5. The safe driving control system of claim 4, wherein the one or more processors further comprise a warning signaling unit configured to transmit the warning signal to the host vehicle, upon determining that the extent of collision danger is the warning part through the collision determination unit.

6. The safe driving control system of claim 4, wherein, upon determining that the extent of collision danger is the danger part, through the collision determination unit, the driving controller is further configured to move the host vehicle in the direction in which there are no vehicles therearound.

7. The safe driving control system of claim 3, wherein the collision determination unit is further configured to receive speed information of the nearby vehicle, and
wherein in a case in which the speed of the nearby vehicle is higher than the speed of the host vehicle, the collision determination unit is further configured to determine the extent of collision danger between the host vehicle and the nearby vehicle based on the speed difference between the host vehicle and the nearby vehicle.

8. The safe driving control system of claim 7, wherein, upon determining that the speed of the nearby vehicle is higher than the speed of the host vehicle through the collision determination unit, the driving controller is further configured to accelerate the host vehicle such that the speed difference between the host vehicle and the nearby vehicle is equal to or greater than the preset safe speed.

9. The safe driving control system of claim 3, wherein the information collection unit is further configured to recognize the obstacle around the host vehicle, and
wherein the driving controller is further configured to control the distance between the host vehicle and the object to be equal to or greater than the preset safe distance when the host vehicle moves toward the obstacle upon moving in the direction in which there are no vehicles therearound as a result of determination that the distance between the host vehicle and the nearby vehicle will cause collision danger.

10. The safe driving control system of claim 3, wherein the information collection unit is further configured to recognize the vehicle lines around the host vehicle, and
wherein the driving controller is further configured to control the host vehicle to not cross the center line when the host vehicle moves in the direction in which there are no vehicles as a result of determination that the distance between the host vehicle and the nearby vehicle will cause collision danger.

11. The safe driving control system of claim 1, wherein the one or more processors are engine control units (ECUs).

12. A safe driving control method for vehicles comprising one or more processors, the method comprising:
recognizing, by the one or more processors, a nearby vehicle approaching a host vehicle, vehicle lines and an obstacle around the host vehicle;
collecting, by the one or more processors, information about the nearby vehicle;
receiving, by the one or more processors, distance information of the nearby vehicle collected in the information collection operation, and determining an extent of collision danger between the host vehicle and the nearby vehicle based on a distance between the host vehicle and the nearby vehicle;
transmitting, by the one or more processors, a warning signal to the host vehicle upon determining that the distance between the host vehicle and the nearby vehicle is less than a preset warning distance;
moving, by the one or more processors, the host vehicle in a direction where there are no vehicles around the host vehicle upon determining that the distance between the host vehicle and the nearby vehicle is less than a preset danger distance which is less than the warning distance;
receiving, by the one or more processors, speed information of the nearby vehicle, and accelerating the host vehicle upon determining that a speed of the nearby vehicle is higher than that of the host vehicle and a speed difference between the host and nearby vehicles is equal to or greater than a preset safe speed;
controlling, by the one or more processors, the host vehicle such that a distance between the host vehicle and the obstacle around the host vehicle is equal to or greater than a preset safe distance when the distance between the host vehicle and the nearby vehicle is less than the preset danger distance and the host vehicle moves toward the obstacle upon moving in the direction where there are no vehicles around the host vehicle; and
controlling, by the one or more processors, the host vehicle to not cross a center line when the distance between the host vehicle and the nearby vehicle is less than the preset danger distance and the host vehicle moves in the direction where there are no vehicles around the host vehicle.

13. The safe driving control method of claim 12, wherein the determining of the extent of collision danger between the host vehicle and the nearby vehicle comprises dividing the extent of collision danger into a warning operation and a danger operation,
wherein the warning operation further comprises setting the distance between the host vehicle and the nearby vehicle to less than the preset warning distance, and
wherein the danger operation further comprises setting the distance between the host vehicle and the nearby vehicle to the preset danger distance shorter than the preset warning distance.

14. A non-transitory computer-readable storage medium storing instructions that, when executed by the one or more processors, cause the one or more processors to perform the method of claim 12.

* * * * *